INVENTOR.
Leon Hoyt Chamberlain
BY Warren, Brooker
Cypher & Anglim
Attorneys

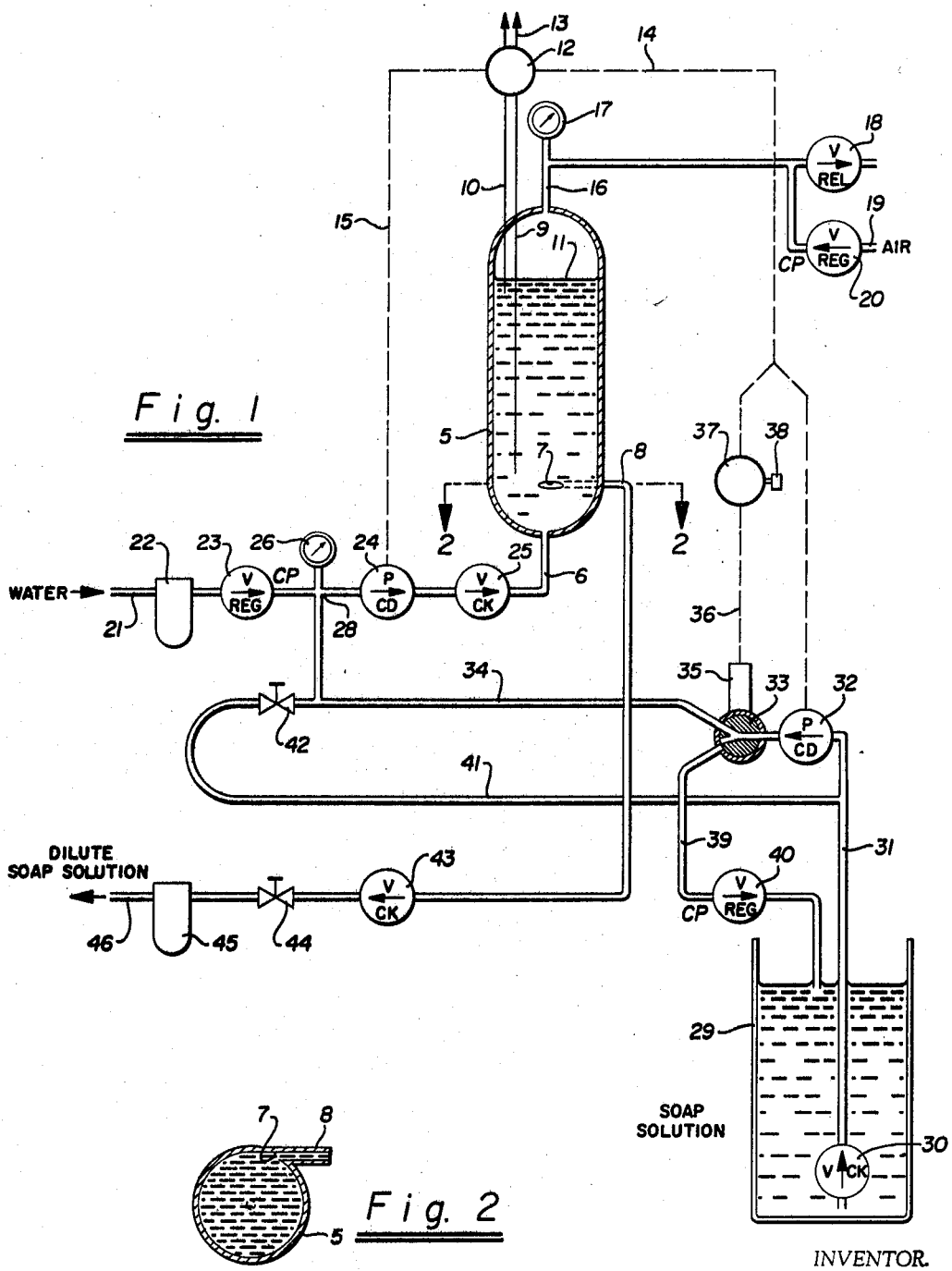

United States Patent Office 3,481,350
Patented Dec. 2, 1969

3,481,350
METHOD AND APPARATUS FOR DILUTING SOAP WITH AN AQUEOUS LIQUID
Leon Hoyt Chamberlain, 21 Hidden Valley Road, Lafayette, Calif. 94549
Filed Feb. 2, 1967, Ser. No. 613,501
Int. Cl. B01f 3/08
U.S. Cl. 137—3                               9 Claims

ABSTRACT OF THE DISCLOSURE

Concentrated soap solution is flowed from a source to a confluence inlet into a stream of aqueous liquid at a controlled rate and the output from the confluence inlet is flowed at a controlled rate by a constant delivery pump into a pressure surge tank during flow periods after the level of dilute soap solution within the tank falls below a lower limit, all flow being suspended when the liquid level reaches an upper limit. Flow of the concentrated soap solution is controlled by a controller in which the relative durations of ON and OFF periods can be controlled. The concentrated soap solution is flowed either by (a) a constant delivery pump operative during flow periods or (b) by suction produced by an eductor in a by-pass line about the constant flow pump which feeds the surge tank.

---

The invention relates to a method and apparatus for diluting concentrated soap solution to produce a dilute soap solution of predetermined concentration and to provide a supply of the latter in a reservoir from which it can be withdrawn at a desired rate.

Such dilute soap solutions are useful, for example, for lubricating conveyors in bottling works, where oil cannot be used. It has been found that soap solutions work well for this purpose, and that the bottles are not effected by the lubricant but come out clean and unstained. The lubricant is applied to the conveyor plates without affecting the bottles. Such a conveyor can also be used for cans, pasteboard and plastic containers, such as are used in various packaging plants.

Soap-mixing apparatus heretofore available for the foregoing purposes has generally depended upon the conductivity of the resulting dilute solution to obtain a control of the soap concentration. This conductivtiy of the dilute solution depends upon the conductivity of the soap as well as on the conductivity of the water. Because there is, usually, a high water to soap ratio, the conductivity of the raw water supplied to the mixing apparatus has a substantial influence on the resultant conductivity, and such water conductivity varies widely. Soaps supplied by different manufacturers also have different conductivities. It is, however, highly desirable that the user be able to use soaps from different manufacturers and still be able to set the machine for a predetermined water-soap ratio. It has been found that control of the water-soap ratio on the basis of electrical conductivity is not satisfactory.

It was also found to be impracticable to supply a dilute soap solution by flowing water and concentrated soap solution at predetermined ratios when the overall flow of the dilute solution varies in accordance with the rate of consumption. Such a variable total flow rate results in variations in the ratio of the concentrated soap solution to the aqueous strain, resulting in a dilute solution of variable compositions.

One of the principal features of the present invention is that the soap-to-water mixture can be accurately determined and maintained without dependence upon electrical conductivity tests made on either the water or the soap, and that accuracy is maintained despite variations in the rate at which the dilute soap solution is withdrawn from the system.

SUMMARY ACCORDING TO THE INVENTION

The dilute solution is produced by flowing aqueous stream (such as water) and concentrated soap solution in predetermined ratio to a confluence point, and flowing the resulting output from the confluence point at a constant rate into a surge tank in which the dilute solution is accumulated and from which it is withdrawn at a flow rate which is independent of the rate of influx of the said output, whereby the liquid level within the tank will vary; when the liquid level in the tank reaches a predetermined lower limit the foregoing flows occur, but when the level reaches a predetermined upper limit all mixing and influx of liquid into the surge tank ceases. The flow of the liquid output from the confluence point into the surge tank is at a constant rate during the flow period; however, the flow of the concentrated soap solution to the confluence point is preferably intermittent, occurring during successive short periods interspersed with periods in which the soap solution does not flow. Thereby the rate of flow of concentrated soap solution during the short flow periods is greater than it would be if it were continuous; further, this provides a convenient way of regulating the average rate of flow of concentrated soap solution, in that the relative durations of the short periods can be varied.

According to another feature of the invention, the surge tank is a pressure tank which is closed on top and compresses a body of gas, such as air, as the level rises. This facilitates discharge of the dilute soap solution from the tank. The air is vented from the top of the tank when the pressure rises above the predetermined tank pressure, and fresh air is admitted to the top of the tank whenever the pressure therein falls below the predetermined tank pressure.

According to still another feature, the liquid output from the confluence point is introduced upward into the surge tank but is withdrawn through a tangential outlet, whereby the dilute, soap solution accumulated within the tank assumes a swirling motion whenever solution is withdrawn therefrom. This has the advantage over systems which the dilute solution is introduced tangentially into the surge tank of preventing vortexes which have resulted in the discharge of gas or foam.

The invention will be further described with reference to the accompanying drawings forming a part of this specification and showing three preferred embodiments by way of illustration, wherein:

FIGURE 1 is a diagrammatic elevation view of the apparatus, parts appearing in section;

FIGURE 2 is a transverse section taken on the line 2—2 of FIGURE 1;

Figure 3:
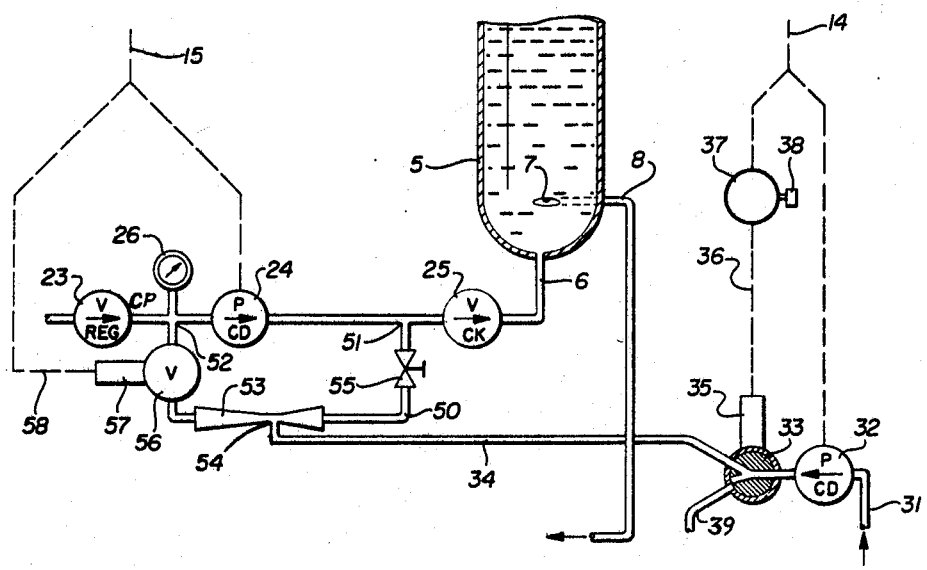
FIGURE 3 is a fragmentary diagrammatic view of a portion of the apparatus, showing a second embodiment.

Referring to FIGURES 1 and 2, the system comprises a surge tank 5 in the form of a closed pressure vessel having a central inlet 6 at the bottom and a tangential outlet 7 near the bottom connected to the withdrawal pipe 8. The tank is provided with a suitable level-sensing device or probe, represented by the lines 9 and 10, which emit signals when the liquid level 11 attains a predetermined lower and a predetermined upper level, respectively, these signals being transmitted to a controller 12 which receives electrical power through a circuit 13. The controller 12 applies power to the circuits 14 and 15 (indicated schematically by a single dashed line) when the liquid level falls to the lower limit; this power remains applied until the liquid level rises to the upper limit, whereupon it is disconnected. The top of the tank is connected by a pipe 16 to a pressure gauge 17 and a relief valve 18, for venting gas from the top of the tank when the pressure therein exceeds the predetermined tank pressure. As the liquid level 11 falls, the pressure within the tank similarly falls and upon dropping below the predetermined tank pressure, air under pressure, supplied to a pipe 19, is admitted through a regulating valve 20.

The aqueous liquid, such as water, is admitted as a stream by a first conduit means, comprising a pipe 21 which is adapted for connection to a source of water, a strainer 22, a pressure-reducing valve 23, a constant-delivery pump 24, and a check valve 25, from which liquid enters the tank at the inlet 6. Pressure of the liquid can be indicated on a pressure gauge 26. The pump 24 may be of any suitable type which delivers liquid at a constant rate, such as a positive displacement pump, or a cenrtifugal pump discharging through a rate controller. Concentrated soap solution is supplied to a confluence inlet 28 from a source 29, such as a tank or the supplier's drums, by a second conduit means which comprises a foot valve 30 (in a form of a check valve), a pipe 31, a constant-delivery pump 32, a diversion valve 33, and a pipe 34. The pump 32 is preferably a positive displacement pump but may be of the type mentioned for the pump 24. The diversion valve 33 is provided with a valve-operator 35, controlled by a pneumatic or electrical signal supplied through a line 36 from a valve controller 37. The valve controller 37 is known per se, and is known commercially as a percentage timer, which emits successive signals via the line 36. Typically, the operating cycle of the controller 37 is 15 seconds, and each first time period, during which the valve 33 interconnects the pump 32 and the pipe 34, may be any fractional part of the cycle time, as determined by the setting of the percentage-setting knob 38. During the intervening or second time period (equal in duration to the difference between the cycle time, e.g. 15 seconds, and the first time period) and the operator 35 positions the valve to interconnect the pump 32 to a return pipe 39. The latter is connected through a back-pressure valve 40 to the source 29. Although the back-pressure valve 40 is not in every case essential, it is desirable for the purpose of preventing emptying of the portion of the pipe 39 between the valves 33 and 40 during periods of prolonged shutdown. For priming the pump 32, there is optionally provided a pipe 41, which is connected at its inlet to the confluence point 28 (or, if desired, to a water main, e.g. upstream of the valve 23) through a shut-off valve 42 and discharges into the pipe 31. Water from the pipe 21 flows into the pipe 41 when the valve 42 is opened to prime the pump 32.

The withdrawal pipe 8 is connected through a check valve 43 and, optionaly, a shut off valve 44 and strainer 45, to an outlet 46. The pumps 24 and 32 and the controller 37 are active only when circuits 14 and 15 are energized. These periods of energization are herein called "flow" periods; when these circuits are not energized neither the pumps nor the controller 37 are operative.

The operation will be described with reference to a complete cycle of change of levels within the tank 5. Assuming that the level 11 has fallen to the lower limit and that the controller 12 has energized the circuits 14 and 15 to establish a flow period, the pump 32 induces flow of concentrated soap solution from the source 29 to the valve 33. This solution is directed intermittently to the pipe 34 when the valve 33 is poistioned as shown, but is returned by the pipe 39 to the source during the intervening second time periods, when the controller 37 shifts the position of the valve 33. The concentrated soap solution, therefore, flows through the pipe 34 at a predetermined, average flow rate which is determined by the setting of the knob 38, this rate being, in general, less than the pumping rate of the pump 32. At the confluence point 28, the concentrated soap solution is admixed to the liquid aqueous stream admitted at 21 and the resultant liquid output is flowed by the constant delivery pump 24 to the tank 5. It may be noted that the said output admitted will be partially diluted soap solution during intermittent time periods and will consist of the aqueous stream only during the alternate time periods. As the liquid level 11 rises, gas at the top of the tank will be compressed and vented to the valve 18 upon reaching predetermined upper limit. When the liquid level reaches its upper limit, the controller 12 de-energizes the circuits 14 and 15, to establish a non-flow period; the operations of the pumps 24 and 32 and other controller 37 are thereupon interrupted. As the dilute soap solution is discharged through the pipe 8 (which may occur also during the filling of the tank) the liquid level 11 falls and air under pressure is admitted by the valve 20 as required to maintain the dilute solution under pressure and facilitate efflux through the pipe 8. Because the pipe 8 is connected to the tangential outlet opening 7, any discharge of solution from the tank causes a swirling motion of the liquid solution to facilitate mixing. This swirling motion is gentler than that which would be produced were the inlet 6 disposed tangentially. It was found, in prior practice, that when the inlet is directed tangentially, the swirling motion occasionally became so severe, due to the formation of a vortex, that the discharge line would discharge air or foam. Foam formation is a particular problem encountered when discharging dilute soap solutions from such a system. When a liquid level reaches the lower limit, the above-described cycle is repeated.

Referring to FIGURE 3, the parts identified by the numbers 5–8, 14, 15, 23–26, and 31–39, denote parts previously described, it being understood that parts not shown may be as in the first embodiment. The first conduit means is provided with a by-pass conduit 50 interconnecting the discharge of the pump 24 at point 51 to the suction side at point 52, and this by-pass conduit has an eductor 53. The point 52 is the confluence point or inlet for the concentrated soap solution. The suction inlet 54 of this eductor is connected to the pipe 34 and constitutes an auxiliary confluence inlet to the first conduit means. The by-pass line may be provided with a flow regulating valve 55. This may be a throttle valve or an adjustable pressure-reducing valve. Further, this by-pass line contains a shut off valve 56, having a valve operator 57 and a controller line 58 connected to the circuit 15 (or if desired to circuit 36). Whenever the latter is energized, the valve 56 is opened but when the circuit 15 (or circuit 36) is de-energized, the valve 56 is closed.

In operation, whenever the pump 24 is in operation, a portion of the liquid discharged therefrom is by-passed through the eductor 53, causing a suction at the inlet 54. This assists in inducing flow of concentrated soap solution from the pipe 34. During the non-flow periods, the valve 56, being shut, prevents the flow of liquid into the eductor 53 and pipe 34. Similarly, the check valve 25 prevents flow of diluted soap solution into the pipe 34. The parts controlled by the circuit 14 operate as previously described.

Figure 4:
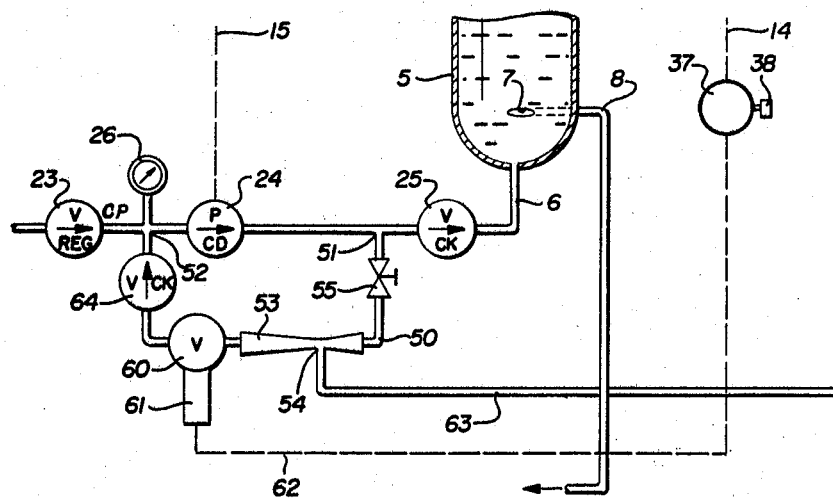
FIGURE 4 is a fragmentary diagrammatic view of the portion of the apparatus showing a third embodiment.

Referring to FIGURE 4, there is showing a modification employing only one constant delivery pump. In this system, the parts identified by the numbers 5–8, 14, 15, 23–26, 37, 38, and 50–55 correspond to parts previously described. The pump 32 is omitted and the valve 33 is replaced by a valve 60 connected in the by-pass conduit 50 between the eductor 53 and the confluence point 52, and having the valve operator 61 which is connected by a line 62 to the controller 37. The auxiliary confluence inlet 54 is connected by a pipe 63 to the source of concentrated soap solution, this pipe corresponding to the pipes 31 and 34 in the previous embodiment. A check valve 64 is optionally provided in the conduit 50, but is not necessary when the controller 37 is of the type that shuts the valve 60 whenever the circuit 14 is de-energized.

The operation of the embodiment of FIGURE 4 is as previously described, with the difference that the valve 60 performs the function of controlling the intermittent supply of the concentrated soap solution to the confluence inlet 52. Whenever the controller 37 opens the valve 60, liquid flows through the by-pass conduit 50, creating a suction at the point 54 and inducing soap solution to enter the system; during the intervening periods, when the valve 60 is closed, no flow occurs in the by-pass conduit 50, the suction at point 54 ceases, and no flow of soap solution occurs. Liquid flows through the pump 24 and check valve 25 at all times that the circuit 15 is energized. The embodiment of FIGURE 4 depends for precision on the maintenance of the constant viscosity in the concentrated soap solution and this may, in some applications, require control of the viscosity as suitable means, such as maintaining the source at a constant temperature, and/or lagging the pipe 63 to prevent heat losses.

I claim:
1. Method of diluting a concentrated soap solution with a flow of water to produce a dilute soap mixture of constant water-soap proportion, which comprise the steps of:
   flowing water from a relatively high pressure supply line through a pressure reducing valve to establish a stable relatively low pressure at a confluence point downstream from said reducing valve,
   flowing said concentrated solution through a constant delivery pump to said confluence point and forming thereby a dilute soap-water mixture,
   flowing the output from said confluence point through another pump into a surge tank having an output for discharge of said mixture therefrom, and
   controlling operation of said pumps in accordance with the level of mixture in said surge tank.

2. The method defined in claim 1, wherein said surge tank is fully enclosed and contains a body of gas above the accumulated mixture, and stabilizing the pressure of said mixture in said tank by maintaining the pressure of said gas at a substantially constant level to provide for constant rate delivery of said last named pump and for uniform discharge pressure of said mixture at said tank output.

3. Method as defined in claim 2 wherein the step of maintaining the pressure of said gas at a substantially constant level comprises:
   (a) discharging a part of said gas when the pressure thereof exceeds a predetermined value, and
   (b) forcing gas into said body of gas whenever the pressure therein falls below said predetermined value.

4. Method as defined in claim 1 wherein
   (a) said output from the confluence point is charged upwardly into said tank, and
   (b) the accumulated dilute mixture is discharged from said tank in a tangential direction to create a swirling movement of the accumulated mixture within the tank.

5. Apparatus for diluting concentrated soap solution with water comprising, a surge tank for accumulating a mixture of said soap solution and water and having an input and an output:
   first conduit means adapted for connection to a relatively high pressure water supply line and being connected to said tank input and having a confluence inlet,
   a pressure reducing valve connected in said first conduit means upstream from said inlet for establishing a relatively low fluid pressure at said inlet,
   a pump disposed in said first conduit means between said inlet and tank,
   a second conduit means connected to said inlet adapted to receive a concentrated soap solution,
   a constant delivery pump and metering valve mounted in said second conduit means for intermittently delivering the soap solution to said inlet for forming a dilute soap-water mixture thereat, and
   control means jointly operating said pumps and metering valve in accordance with the level of mixture in said tank.

6. Apparatus according to claim 5 and a by-pass conduit connected to inlet and discharge sides of said first named pump and an eductor in said by-pass conduit, said eductor having a suction inlet constituting the said confluence inlet.

7. Apparatus according to claim 6 and valve means operated by said control means and being situated in said by-pass conduit between the discharge side of the eductor and the inlet to said first named pump.

8. Apparatus as defined in claim 5 wherein said surge tank is fully enclosed, and:
   (a) pressure-relief means for venting gas from the tank above the mixture therein when the pressure of said gas exceeds a predetermined value, and
   (b) means for forcing gas into said tank above the mixture when the pressure therein falls below said predetermined value.

9. Apparatus as defined in claim 5 wherein:
   (a) said tank input is directed upwardly into the mixture therein, and
   (b) said tank output is an opening near the tank bottom disposed tangentially thereto, for creating a swirling movement of the accumulated dilute soap mixture within the tank.

References Cited

UNITED STATES PATENTS

| 1,698,537 | 1/1929 | Cushwa | 139—99 XR |
| 2,218,393 | 10/1940 | Corydon. | |
| 2,371,028 | 3/1945 | Christ | 137—170.3 |
| 2,680,715 | 6/1954 | Cook | 137—114 |
| 2,710,016 | 6/1955 | Gallmeyer | 137—111 |
| 2,711,252 | 6/1955 | Oliver | 137—209 |
| 2,826,211 | 3/1958 | Reed | 137—98 |
| 3,049,142 | 8/1962 | Oliver | 137—114 |
| 3,070,111 | 12/1962 | Owens. | |
| 3,100,496 | 8/1963 | Reiser | 137—111 |
| 3,259,141 | 7/1966 | Brendon | 137—3 |

STANLEY N. GILREATH, Primary Examiner

W. H. SCHROEDER, Assistant Examiner

U.S. Cl. X.R.

137—101.11, 101.27, 170.1, 209, 604, 625.29